United States Patent [19]

Broker et al.

[11] Patent Number: 5,253,195

[45] Date of Patent: Oct. 12, 1993

[54] HIGH SPEED MULTIPLIER

[75] Inventors: Harold J. Broker, Ulster Park; Russell S. Cook, Poughkeepsie; James O'Connor, Ulster Park; Nelson S. Xu, Hyde Park, all of N.Y.

[73] Assignee: International Business Machines Corporation, Armonk, N.Y.

[21] Appl. No.: 13,541

[22] Filed: Feb. 4, 1993

Related U.S. Application Data

[63] Continuation of Ser. No. 765,859, Sep. 26, 1991, abandoned.

[51] Int. Cl.⁵ .......................... G06F 7/52; G06F 11/00
[52] U.S. Cl. ..................... 364/759; 364/760; 364/737
[58] Field of Search ............ 364/745, 748, 750.5, 364/754, 755, 759, 737, 739, 746, 760, 766, 715.08, 757

[56] References Cited

U.S. PATENT DOCUMENTS

| 3,761,698 | 9/1973 | Stephenson | 235/164 |
| 3,873,820 | 3/1975 | Parr et al. | 364/739 |
| 4,594,679 | 6/1986 | George et al. | 364/754 |
| 4,769,780 | 9/1988 | Chang | 364/760 |
| 4,799,183 | 1/1989 | Nakano et al. | 364/760 |
| 4,858,163 | 8/1989 | Boreland | 364/748 |
| 4,989,168 | 1/1991 | Kuroka et al. | 364/715 |

FOREIGN PATENT DOCUMENTS 318957 6/1989 European Pat. Off. .

OTHER PUBLICATIONS

IBM Technical Disclosure Bulletin, vol. 33, No. 6B, Nov. 1990, "High Speed Multiply Using a 5-Way Adder", K. Maass et al., pp. 315-317.
IBM TDB, vol. 20, No. 9, Feb. 1978, "Multiplier Decoding with Look-Ahead", A. Weinberger, pp. 3591-3593.

Primary Examiner—Jerry Smith
Assistant Examiner—Chuong D. Ngo
Attorney, Agent, or Firm—Floyd A. Gonzalez

[57] ABSTRACT

A high speed digital multiplier utilizes a variation in known shift-and-add algorithms. Each cycle, a single digit of the multiplier and the entire multiplicand are processed to form a "partial product" that is added to the result of the next cycle. The end result is a two part product, the high order product being generated by a carry-propagate adder, and the low order product being generated by a "spill adder" that produces one digit each cycle. Inputs of a carry-propagate adder are fed directly from outputs of a carry-save adder rather than running sum and carry registers. With a multiplier digit of 16-bits, a fixed point halfword multiply requires one execution cycle, a fixed point fullword multiply requires two execution cycles, and a floating point long multiply requires four execution cycles with additional overhead if pre-or post-normalization is required.

12 Claims, 8 Drawing Sheets

TABLE 1: MAPPING MULTIPLIER POSITION TO RECODE GROUP A THROUGH H

| CY | BIT POSITION | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| 1 | M48 | M49 | M50 | M51 | M52 | M53 | M54 | M55 | M56 | M57 | M58 | M59 | M60 | M61 | M62 | M63 | 0 |
| 2 | M32 | M33 | M34 | M35 | M36 | M37 | M38 | M39 | M40 | M41 | M42 | M43 | M44 | M45 | M46 | M47 | M48 |
| 3 | M16 | M17 | M18 | M19 | M20 | M21 | M22 | M23 | M24 | M25 | M26 | M27 | M28 | M29 | M30 | M31 | M32 |
| 4 | 0 | 0 | 0 | 0 | 0 | 0 | 0 | 0 | M08 | M09 | M10 | M11 | M12 | M13 | M14 | M15 | M16 |

↓H(0:2) ↓G(0:1) ↓F(0:1) ↓E(0:1) ↓D(0:1) ↓C(0:1) ↓B(0:1) ↓A(0:1)

TABLE 2: THE DEFINITION OF THE RECODE GROUP A

| BIT POS. 14 15 16 | A(0:1) | VALUE | EXPLANATION |
|---|---|---|---|
| 0 0 0 | 0 0 | 0 | ADD ZEROS |
| 0 0 1 | 0 1 | +1 | ADD MULTIPLICAND WITHOUT SHIFTING |
| 0 1 0 | 0 1 | +1 | ADD MULTIPLICAND WITHOUT SHIFTING |
| 0 1 1 | 1 1 | +2 | ADD MULTIPLICAND WITH 1 BIT SHIFT LEFT |
| 1 0 0 | 1 1 | +2 | ADD MULTIPLICAND WITH 1 BIT SHIFT LEFT |
| 1 0 1 | 1 0 | −1 | ADD 2's COMPLEMENT MCAND WITHOUT SHIFTING |
| 1 1 0 | 1 0 | −1 | ADD 2's COMPLEMENT MCAND WITHOUT SHIFTING |
| 1 1 1 | 0 0 | 0 | ADD ZEROS |

RECODE GROUP A THROUGH G ARE SIMILAR EXCEPT THE RE-CODED BIT VALUES ARE DIFFERENT. THE BINARY WEIGHT VALUE OF RECODE GROUP H THROUGH A ARE: '32K 16K 8K 4K 2K 1K 512 256 128 64 32 16 8 4 2 1 0'.

TABLE 3: THE DEFINITION OF THE RECODE GROUP H

| BIT POS. 0 1 8 | H(0:2) | VALUE | EXPLANATION |
|---|---|---|---|
| 0 0 0 | 1 0 0 | 0 | ADD ZEROS |
| 0 0 1 | 0 0 0 | +16K | ADD MULTIPLICAND WITH 14-BIT SHIFT LEFT |
| 0 1 0 | 0 0 0 | +16K | ADD MULTIPLICAND WITH 14-BIT SHIFT LEFT |
| 0 1 1 | 0 1 0 | +32K | ADD MULTIPLICAND WITH 15-BIT SHIFT LEFT |
| 1 0 0 | 0 1 1 | −32K | ADD 2's COMPL. WITH 15-BIT SHIFT LEFT |
| 1 0 1 | 0 0 1 | −16K | ADD 2's COMPL. WITH 14-BIT SHIFT LEFT |
| 1 1 0 | 0 0 1 | −16K | ADD 2's COMPL. WITH 14-BIT SHIFT LEFT |
| 1 1 1 | 1 0 0 | 0 | ADD ZEROS |

FIG.5

| CYCLE | 1 | 2 | 3 |
|---|---|---|---|
| START | — | | |
| END OP | — | | |
| PRESHIFT MCND | −L8− | | |
| MPLR(BITS) X MCND | −16− | | |
| FEEDBACK SUM | | | |
| HI ORDER PROD GEN | −40− | | |
| LO ORDER PROD GEN | −8− | | |
| HI ORDER PROD BUS | −48− | | CONCATENATE HI & LO PRODUCTS |
| LO ORDER PROD BUS | | | UNUSED |
| RESULT BITS C−REG | | −48− | |
| RESULT BITS A−REG | | | |
| SUM REG | | −40− | |
| SPA REG | | −8− | |
| MPLR→RES GEN1 MPLR RES REG | −16− | −16− | |
| MCND→RES GEN2 MCND RES REG | −32− | −32− | |
| SUM→RES GEN3 | | −40− | |
| SPA→RES GEN4 SPA RES REG | | −8− | |
| ENABLE RES CHECK REPORT ERROR | | — | — |

FIG.6

| CYCLE | 1 | 2 | 3 | 4 |
|---|---|---|---|---|
| START | — | | | |
| END OP | | — | | |
| PRESHIFT MCND | -L24- | -L24- | | |
| MPLR(BITS) X MCND | -16- | -16- | | |
| FEEDBACK SUM | | — | | |
| HI ORDER PROD GEN | -48- | -56- | | |
| LO ORDER PROD GEN | | -8- | | |
| HI ORDER PROD BUS | | -64- | | CONCATENATE HI & LO PRODUCTS |
| LO ORDER PROD BUS | | | | UNUSED |
| RESULT BITS C-REG | | | -64- | |
| RESULT BITS A-REG | | | | |
| SUM REG | | -48- | -56- | |
| SPA REG | | | -8- | |
| MPLR→RES GEN1 | -16- | -16- | | |
| MPLR RES REG | | -16- | -32- | |
| MCND→RES GEN2 | -32- | -32- | | |
| MCND RES REG | | -32- | -32- | |
| SUM→RES GEN3 | | | -56- | |
| SPA→RES GEN4 | | | -8- | |
| SPA RES REG | | | | |
| ENABLE RES CHECK REPORT ERROR | | | — | — |

FIG.7

| CYCLE | 1 | 2 | 3 | 4 | 5 | 6 |
|---|---|---|---|---|---|---|
| START | —— | | | | | |
| END OP | | | | —— | | |
| PRESHIFT MCND | | | | | | |
| MPLR(BITS) X MCND | -16- | -16- | -16- | -8- | | |
| FEEDBACK SUM | | —— | —— | —— | | |
| HI ORDER PROD GEN | -56- | -56- | -56- | -48- | | |
| LO ORDER PROD GEN | -16- | -16- | -16- | -16- | | |
| HI ORDER PROD BUS | | | | -56- | | |
| LO ORDER PROD BUS | -8- | -16- | -16- | -16- | | |
| RESULT BITS C-REG | | | | | -56- | |
| RESULT BITS A-REG | | -8- | -24- | -40- | -56- | |
| SUM REG | | -56- | -56- | -56- | -48- | |
| SPA REG | | -16- | -16- | -16- | -16- | |
| MPLR→RES GEN1<br>MPLR RES REG | -16- | -16-<br>-16- | -16-<br>-32- | -16-<br>-48- | -56- | |
| MCND→RES GEN3<br>MCND RES REG | -56- | -56-<br>-56- | -56-<br>-56- | -56-<br>-56- | -56- | |
| SUM→RES GEN3 | | | | | -56- | |
| SPA→RES GEN4<br>SPA RES REG | | -16- | -32-<br>-16- | -48-<br>-32- | -56-<br>-48 | |
| ENABLE RES CHECK<br>REPORT ERROR | | | | | —— | —— |

FIG.8

HIGH SPEED MULTIPLIER

CROSS-REFERENCE TO RELATED APPLICATION

This application is a continuation of application Ser. No. 07/765,859, filed Sep. 26, 1991, now abandoned.

BACKGROUND OF THE INVENTION

1. Field of the Invention

The present invention generally relates to main frame digital computers and, more particularly, to an improved high speed multiplier which is optimized for fixed-point calculations yet produces floating-point results faster than some designs which were optimized for floating-point calculations.

2. Description of the Prior Art

As is well known in the art, the product of a multiplication can be formed by shifting and adding the multiplicand as a function of the individual bits of the multiplier. This requires an adder with as many ports as there are bits in the multiplier. Using an iterative algorithm with a relatively small multiplier digit saves on adder hardware; however, additional ports are needed for the running sum and carry feedback. Thus, a ten bit multiplier digit would need a twelve-port adder.

To reduce the number of addends, various schemes have been developed to recode the multiplicand into a set of true and/or complemented multiples based on a decoding of adjacent bits in the multiplier. These schemes cut the number of addends in half. In the example above, the 10-bit digit multiplier would need a seven port adder, five ports for multiples of the multiplicand and one port each for the running sum and carry. The outputs of the adder tree are sum and carry bits which must be added together by a Carry-Propagate Adder (CPA) to produce a final product. In the iterative multiply device, one digit of the result is generated during each iteration. As additional digits are generated, they are concatenated together to produce the whole product.

U.S. Pat. No. 4,769,780 to D. C. Chang discloses a high speed multiplier wherein the multiplier and multiplicand are stored in A and B registers, respectively, and the result of the multiplication is stored in registers A and C, with the low order portion of the result in register A and the high order portion of the result in register C. Eleven multiplier bits in register A are selectively gated to recoding circuitry which recodes the multiplier into five control groups. These control groups control shift gates connected to register B to gate selected groups of multiples of the multiplicand to a first Carry-Save Adder (CSA), the sum and carry outputs of which are applied to a second CSA that accumulates partial products from iteration to iteration. A Spill Adder (SPA), connected to the second CSA, generates a low order portion of a final result of the multiplication. This low order portion is temporarily stored in an SPA register and transferred to the A register. These product digits are stored in locations that have been vacated by shifting and retiring the multiplier digits. The high order portion of the multiplication result is generated by a full adder connected to receive the sum and carry outputs of the second CSA, the high order output being stored in the C register.

This particular multiplier operates at a rate of double the system clock frequency on a 10-bit wide data path on each double frequency cycle. The double frequency clock of the Chang high speed multiplier is a highly complex feature. Many staging registers are needed in such a design since the half-cycle paths are effectively limited in the allowable number of logic levels thereby increasing the number of cycles necessary to perform any operation.

Other multiply devices including those described in U.S. Pat. No. 4,584,679 to S. George et al. are not iterative in nature. They retire the entire multiplier value at once by generating (usually) four partial products in parallel where each partial product is the result of the multiplication of the multiplicand with a subset of the multiplier. These partial products must then be assimilated into the final product. While adders of the type are fast, they usually involve some amount of data staging and require large amounts of hardware.

A common feature of many multiply device designs in mainframe computers is the optimization of the design around scientific or floating point data. As a result, operations involving fixed point data such as that more common in commercial applications can suffer. As an example, the Chang device requires an extra cycle to align fixed point data before multiplication and another cycle to align the fullword result for putaway.

SUMMARY OF THE INVENTION

In contrast to the Chang multiplier, for example, the preferred embodiment of the invention yields the results of fixed point halfword multiplication, the format found most often in commercial applications, in one cycle. Fullword multiplication is performed in two cycles. Floating point or scientific results can be produced in as little as four cycles which is a significant improvement over some prior scientific or floating point multipliers.

It is therefore an object of the present invention to provide a high performance multiply device capable of performing both scientific (floating-point) and commercial (fixed-point) multiplication operations.

It is another object of the invention to provide novel hardware to optimize fixed-point execution in a floating-point multiply device.

According to the invention, a high performance multiplier is provided which utilizes a "pre-shift/sign extend" device operating on the multiplicand. This device saves one execution cycle on fixed-point operations by eliminating the need for an extra cycle to perform the data alignment and sign extension of the multiplicand as in the prior art.

The preferred embodiment of the invention provides the logic circuitry needed to multiply a 16-bit multiplier digit by a 56-bit multiplicand by means of a recode device that translates the 16-bit multiplier digit into eight control signal groups; a shifting device that shifts and complements the multiplicand data output from the "pre-shift/sign extend" device into eight multiples of the multiplicand according to the eight control signal groups; a 9-2 Carry-Save Adder (CSA) device that adds the multiples of the multiplicand and optionally a saved partial product from the previous cycle (iteration) during operations with multiplier values greater than sixteen bits in length into a sum value and a carry value; a two input spill adder (SPA) that adds the low order sixteen bits of the sum and carry values to produce a low order (spill) result digit; and a two input Carry-Propagate Adder (CPA) that adds the remaining high order bits of the sum and carry values to produce the high order part of the result and optionally a partial product to be used in an iterative nature during operations with multiplier values greater than sixteen bits in length.

It is yet another object of this invention to provide a multiply device without any intermediate staging registers such that the product of the multiplication of both operands is produced in one execution cycle.

It is a further object of the invention to provide a novel bus architecture for the result data which aligns the result data in such a way that one execution cycle is saved during result putaway for fixed-point fullword operations over the prior art.

It is still a further object of the instant invention to provide a new residue checking scheme to check the operation of the multiply device with a novel architecture that allows reporting an error the cycle after product generation for all operation formats.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

In the discussion to follow, several registers are referenced. Registers A, B and C are generally described as working registers in which, by convention, the multiplier, multiplicand and result or product are stored. The A register stores both the multiplier and, for floating-point operations, the low order portion of the result, the B register stores the multiplicand, and the C register stores the high order portion of the result. This is the convention used, for example, in the patent to Chang, supra.

Figure 1:
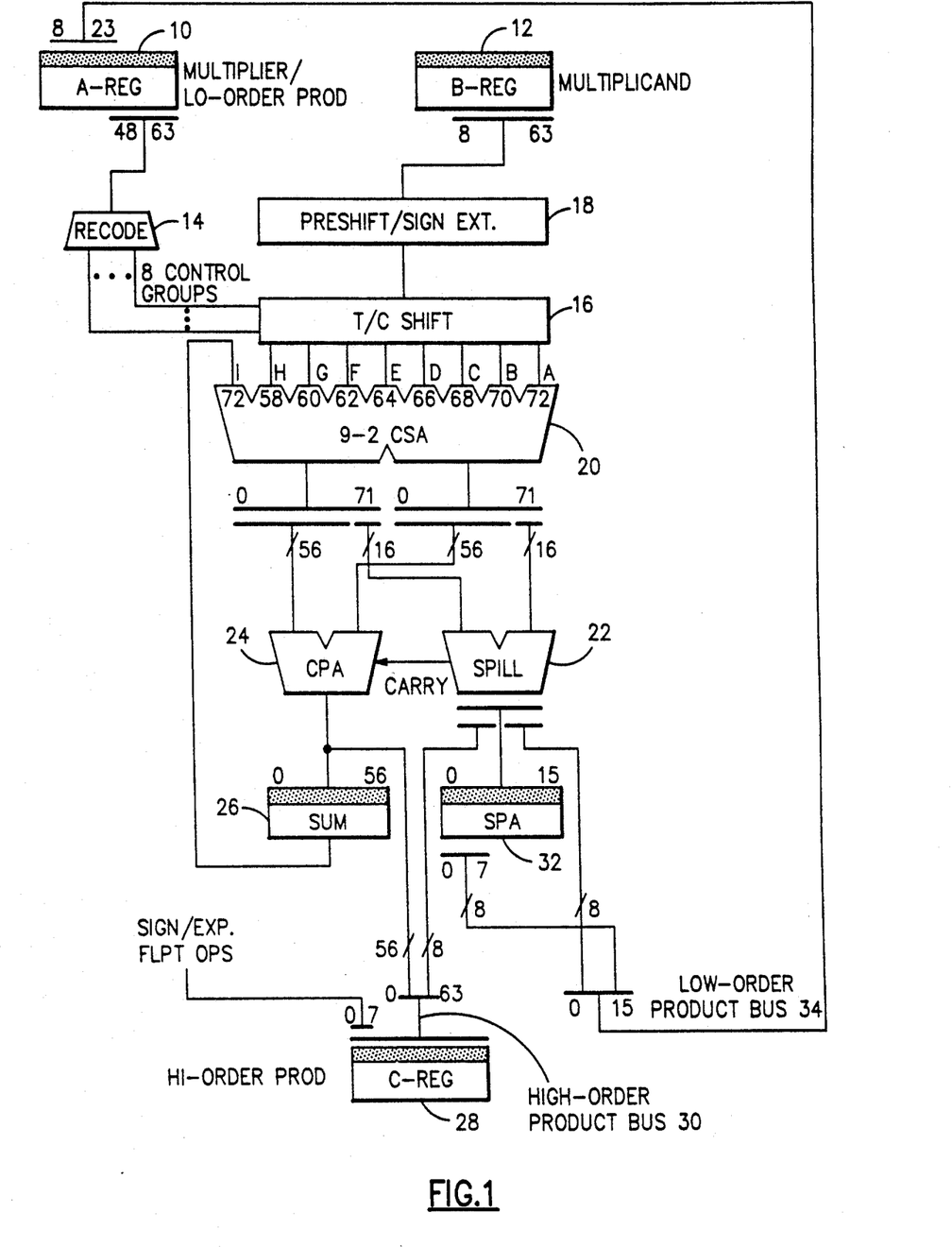
FIG. 1 is a block diagram of the preferred embodiment of the high speed multiplier according to the invention which supports the main data flow.

Referring now to the drawings, and more particularly to FIG. 1, there is shown the main data flow of the high speed multiplier according to a preferred embodiment of the invention. This embodiment is designed to multiply sixteen by fifty-six bits in one execution cycle. More specifically, the multiplier, comprising up to three and one half sixteen bit digits, is held in the A register 10, while the multiplicand, comprising fifty-six bits, is held in the B register 12.

The A register holds the multiplier data and, for floating-point operations, the low order product result. There are three parts of the data format in a floating-point operation; bit 0 is the sign bit, bits 1-7 are the exponent data, and bits 8-63 are the base data. The sign and exponent data is not needed in the data flow shown in FIG. 1, as it is handled separately elsewhere in the processing. The data that is processed by the high speed multiplier is in bit locations 8-63 of the A register. The low order product result is loaded into the A register at bit locations 8-23. Each cycle, a separate part of the processor shifts the A register data right sixteen bits to bring the next multiplier digit into bit locations 48-63 and make room for the next low order product digit.

For fixed-point operations, the fixed-point, fullword data is in bit locations 32-63. Every cycle, there is a right-shift of sixteen bits to get the appropriate digit into bit locations 48-63. The fixed-point, halfword data is in bit locations 48-63. No shifting of this data is necessary since all the data is processed in the first cycle.

The B register 12 holds the multiplicand data. The multiplicand is loaded into the B register and remains there throughout the operation. Again, for floating-point operations, there is a sign and exponent information in bit locations 0-7, and the base data is in bit locations 8-63. For fixed-point operations, the data is in bit locations 32-63, as in the case for register A.

The multiplier, loaded into the A register 10, is directly accessed by the recode circuitry 14. The recode circuitry 14 generates control groups used to control the True/Complement (T/C) shift gates 16 connected to receive the multiplicand stored in the B register 12 via the preshift/sign extend circuitry 18.

The pre-shift/sign extend circuitry 18 pre-shifts multiplicand data during fixed-point operations to enable a faster putaway. For a halfword operation, there is a left shift of eight bits, and for fullword operation, there is a left shift of twenty-four bits. Zeros are appended to the right in both cases.

In the IBM 3090 high speed multiplier, the fixed-point multiply microcode pre-shifted the operands before starting the multiply hardware to align the results properly. For halfword operations, the result is returned as a high order product to the C register while the spill adder register is ignored. This product is forty-eight bits long. The low order thirty-two bits are put away as the result, while the high order bits are ignored. For fullword operations, the 64-bit result is split such that the high order thirty-two bits are returned to C register bytes four through seven, and the low order thirty-two bits are returned to A register bytes one through four. The A register value is put away via a shift through the C register. This last shift operation is not required in the current invention.

This microcode preshift cost an extra cycle in performance. This function has now been implemented in the hardware according to the present invention with the shift amount determined by the value of the Instruction register (I-register) bits two and three of the operation code (op-code). This shift also requires sign extension for fixed-point operations, so B register bit thirty-two is propagated left when necessary.

The output of the preshift/sign circuitry 18 is supplied to the T/C shift gates 16. T/C shift gates 16 look at the control groups from the recode circuitry 14 and shifts the multiplicand left, as appropriate, and complements, as appropriate, to produce the eight multiples needed by the Carry-Save Adder (CSA) tree 20. If a multiple has to be negative, only a one's complement is performed at this point. Later, a "hot" one will be injected into the CSA tree 20 at the appropriate location to provide the full two's compliment. This is discussed in more detail hereinafter with reference to FIG. 5.

After multiplicand alignment in circuitry 18, the multiples of the multiplicand in B register 12 to be added are determined from the recoded multiplier output from the recoding circuitry 14. The multiplicand in T/C shift gates 16 is shifted in one level in all but the last control group. Here two levels are needed. This does not add a level to the critical path, however, since this multiple feeds a "late input" of the 9-2 Carry-Save Adder (CSA) tree 20. The CSA 20 is referred to as a 9-2 adder meaning that it has nine input ports and two output ports.

The multiplier according to this invention makes use of the same recode scheme as the IBM 3090 high speed multiplier but implements it differently. More specifically, sixteen bits are retired at a time from the A register 10 which holds the multiplier data. The sixteen bits are recoded into eight control groups. The recoding and weighting are described in more detail hereinafter with reference to FIG. 4. The control groups determine which of eight multiples of the multiplicand add together in the Carry-Save Adder (CSA) tree 20. For full recoding, the high order bit of the multiplier digit must be remembered and concatenated after the least significant bit of the next multiplier digit (see FIG. 4). This bit is latched in the recode circuitry 14.

The 16-bit multiplier recodes to the following thirty-three control values in eight groups:

Group 1 (lowest order bits): O, $TL_0$, $CL_0$, $TL_1$
Group 2: O, $TL_2$, $CL_2$, $TL_3$
Group 3: O, $TL_4$, $CL_4$, $TL_5$
Group 4: O, $TL_6$, $CL_6$, $TL_7$
Group 5: O, $TL_8$, $CL_8$, $TL_9$
Group 6: O, $TL_{10}$, $CL_{10}$, $TL_{11}$
Group 7: O, $TL_{12}$, $CL_{12}$, $CL_{13}$
Group 8 (highest order bits): O, $TL_{14}$, $CL_{14}$, $TL_{15}$, $CL_{15}$ In this notation, T and C mean True and Complement, respectively, and $L_{xx}$ means shift left by xx bit positions while "O" means that a zero should be gated in for that multiple. The IBM 3090 high speed multiplier latched these twenty-one values to be used in the next half cycle. This is one of the staging levels removed to boost the performance of the present invention.

The Spill Adder (SPA) 22 is a full adder which adds the sixteen low-order or spill bit positions of the sum and carry-out bits of the 9-2 CSA tree 20. Note that the carry value is shifted left one bit for proper propagation. The Carry Propagate Adder (CPA) 24 is similar to the SPA 22, but it operates on the high-order 56-bits from the 9-2 CSA tree 20 to generate the high-order sum stored in the sum register 26 or gated to the C register 28 via high-order product bus 30 as the high-order product during floating-point operations. The high-order bus 30 is a concatenation of the output 56-bits of the CPA 24 and the high-order eight bits of the SPA 22. During floating-point operations, the highest order eight bits of the CPA 24 are "0", and that is illustrated in Table 1 of FIG. 4. The sign and exponent bits are gated to the C register 28 in place of the "0" data. Sign and exponent handling occurs in other areas of processing not part of this invention and therefore not shown. Processing of the exponents (characteristics) for floating-point operations is totally under microcode control. Extended operations are treated as four complete (long) multiplies with the resulting "partial products" added together, all under microcode control. In the event that post normalization is required, the multiplier generates the multiply leading zero (MLZ) signal. This will tell the shifter and the microcode to shift the result left four bits with the micro-order LF*MLZ.

During fixed-point, fullword operations, the product result from the SPA 22 and the CPA 24 uses the full 64-bit bus 30, and for fixed-point, halfword operations, the result is transmitted as the low-order 48-bits of bus 30. The bus utilization will become clearer in the following description with reference to FIGS. 6 to 8 which show the cycle activities and result reporting for the fixed-point, halfword, the fixed-point, fullword and the floating-point operations, respectively.

The output of the SPA 22 is stored in SPA register 32, and the contents of SPA register 32 and the SPA 22 are gated to the low-order product bus 34. The low-order product bus 34 will always be equal to "0" for fixed-point operations due to the pre-shifting by the preshift/sign circuitry 18. In this way, the result will be contained totally in the C register 28 and makes putaway very easy. Putaway is done from the C register 28 into a floating-point or general purpose register, as in S/370 architecture. During floating-point operations, the low-order eight bits of data are returned to the A register 10 for the first cycle. On subsequent cycles, sixteen bits are returned, eight bits from the SPA 22 and eight bits from the SPA register 32. While this putaway scheme may not seem straightforward, it does enable the multiplier or A register digits to always be right justified, simplifying the circuitry for recode by saving one level of logic. This is achieved without any cost in levels of logic in the bus 34.

When the multiplicand is to be complimented for a particular multiple, a two's complement is needed. This is performed with the SPA 22 by inverting the multiplicand while shifting to generate a one's complement in the T/C shift gates 16. The $CL_0$, $CL_2$, $CL_4$, $CL_6$, $CL_8$, $CL_{10}$, $CL_{12}$, $CL_{14}$, and $CL_{15}$ control points each generate a carry into the proper spill adder bit position to complete the two's complement of its respective multiple.

Figure 2:
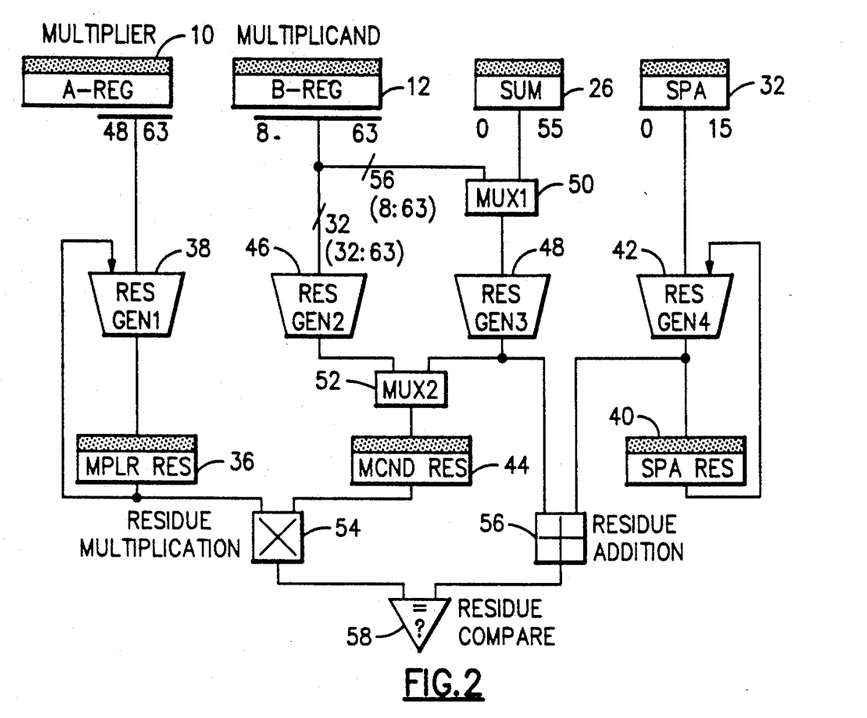
FIG. 2 is a block diagram of the residue checking circuit of the preferred embodiment of the multiplier device according to the invention.

Referring now to FIG. 2, there is shown the residue checking structure. The A register 10, B register 12, and the sum and SPA registers 26 and 32 are the same as in FIG. 1. The multiplier residue register 36 accumulates residue for the whole multiplier value. The accumulated residue is fed back during residue generation for summation by residue generator 38. The SPA residue is generated in a similar fashion, being accumulated in SPA residue register 40 and fed back to residue generator 42. Thus, residue generators 38 and 42 generate residue for multiplier and SPA register digits, respectively, and include the circuitry to add in the accumulated data from the respective residue registers for the operations in that cycle.

The multiplicand residue register 44 is not an accumulator as the whole data value is available once. Residue generators 46 and 48 are residue generators for thirty-two and fifty-six bits of data, respectively, with no feedback loops since the whole data value is available at once. The residue value is valid immediately. Residue generator 46 is dedicated to producing the residue of the multiplicand during all fixed-point operations. Residue generator 48 is a common residue generator used to produce the residue of the multiplicand for all floating-point operations and the residue of the high-order product from the sum register 26. The sum data is 56-bits wide, and its residue is calculated one cycle after product generation for operations requiring greater than one cycle. The same generator can generate the multiplicand residue on any of the earlier cycles. Contention would occur for a single cycle fixed-point halfword operation and thus a residue generator 46 is provided at a width of 32-bits instead of 56-bits as with fixed-point, halfword multiplicands. Multiplexer 50 selects which of fifty-six bits from the B register 12 or the sum register 26 to supply to the residue generator 48. The multiplicand residue register 44 receives outputs from residue generators 46 or 48 via multiplexer 52. A significant savings in circuitry is realized since 24-bits worth of residue generation is saved in residue generator 46 and also allows timely residue checking, timely being one cycle after product generation for all operations. Multiplexers 50 and 52 are controlled by a state machine as a function of the op-code (operand format) and execution cycle count to decide which residue generator, 46 or 48, to use for multiplicand residue generation.

Residue errors are detected by the residue multiplication 54, residue addition 56 and residue compare 58. The residue arithmetic indicates that there is an error when the product of the multiplier residue in register 36 times the residue of the multiplicand register 44 does not equal the sum of the residue of the high-order product from residue generator 48 plus the residue of the low-order product from residue generator 42.

Figure 3:
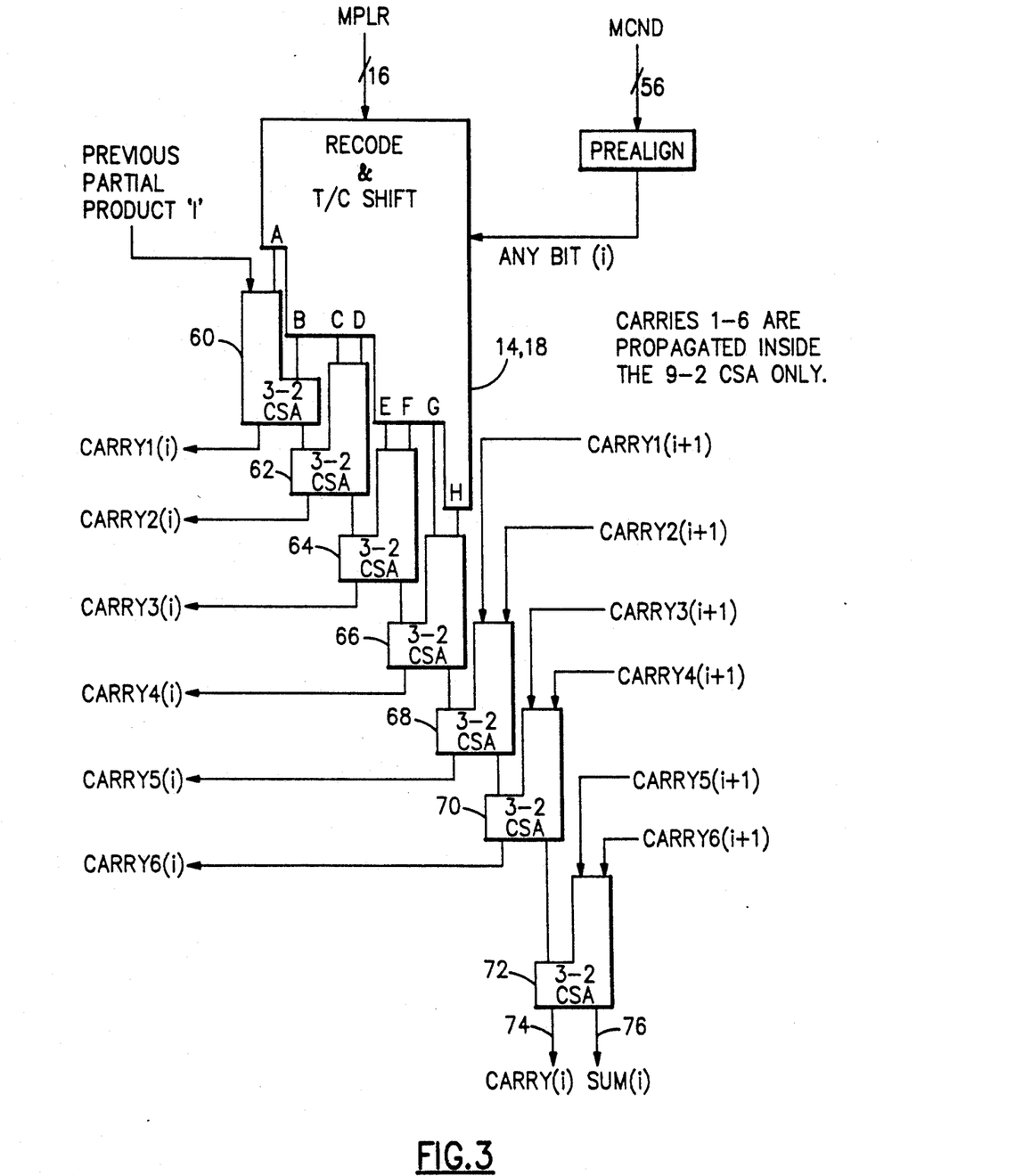
FIG. 3 is detailed block diagram of the 9-2 Carry-Save Adder (CSA) tree used in the multiplier shown in FIG. 1 showing the shift-and-add data flow according to the preferred embodiment o the invention.

The shift/add data flow shown in FIG. 3 was briefly referred to in the description of FIG. 1. What is shown in FIG. 3 is the organization of 3-2 CSA elements 60, 62, 64, 66, 68, 70, and 72 to allow the use of late inputs for the multiple data, labeled B through H. The recode and control group for multiple A is the function of the two low-order bits of the multiplier concatenated with the remembered high-order bit from the previous multiplier digit (or a 0 in the first cycle), while each successive recode and control group is the function of all previous bits and the next two higher-order bits (see FIG. 3). Use of late input to the CSA tree simplifies control generation of the higher-order multiples and reduces the amount of loading on the multiplier on the A register bus. Input I of the 9-2 CAS 20 from FIG. 1 is noted by the previous sum input in FIG. 3.

The 9-2 CSA tree 20 takes eight multiples and also the previous partial product, when appropriate, and adds them together in the adder elements. FIG. 3 shows a bit slice representation including the intermediate carrying propagation. Notice that the previous sum is 56-bits wide but is right justified by a right shift of 16-bits with sign extension to the left to produce a 72-bit value necessary to maintain proper weighting. As shown in FIG. 3, the eight outputs of the T/C shift gates are applied to eight of the nine input ports of the 9-2 CSA 20, the last ports receiving partial product outputs from the preceding cycle of the adder.

The two output ports 74 and 76 provide a 72-bit carry output and a 72-bit sum output, respectively. The low order 16-bit carry and sum outputs are supplied to the SPA 22, while the high order bits are to the CPA 24 which generates the high order bits of the final product that are stored in the C register 28.

Figure 4:
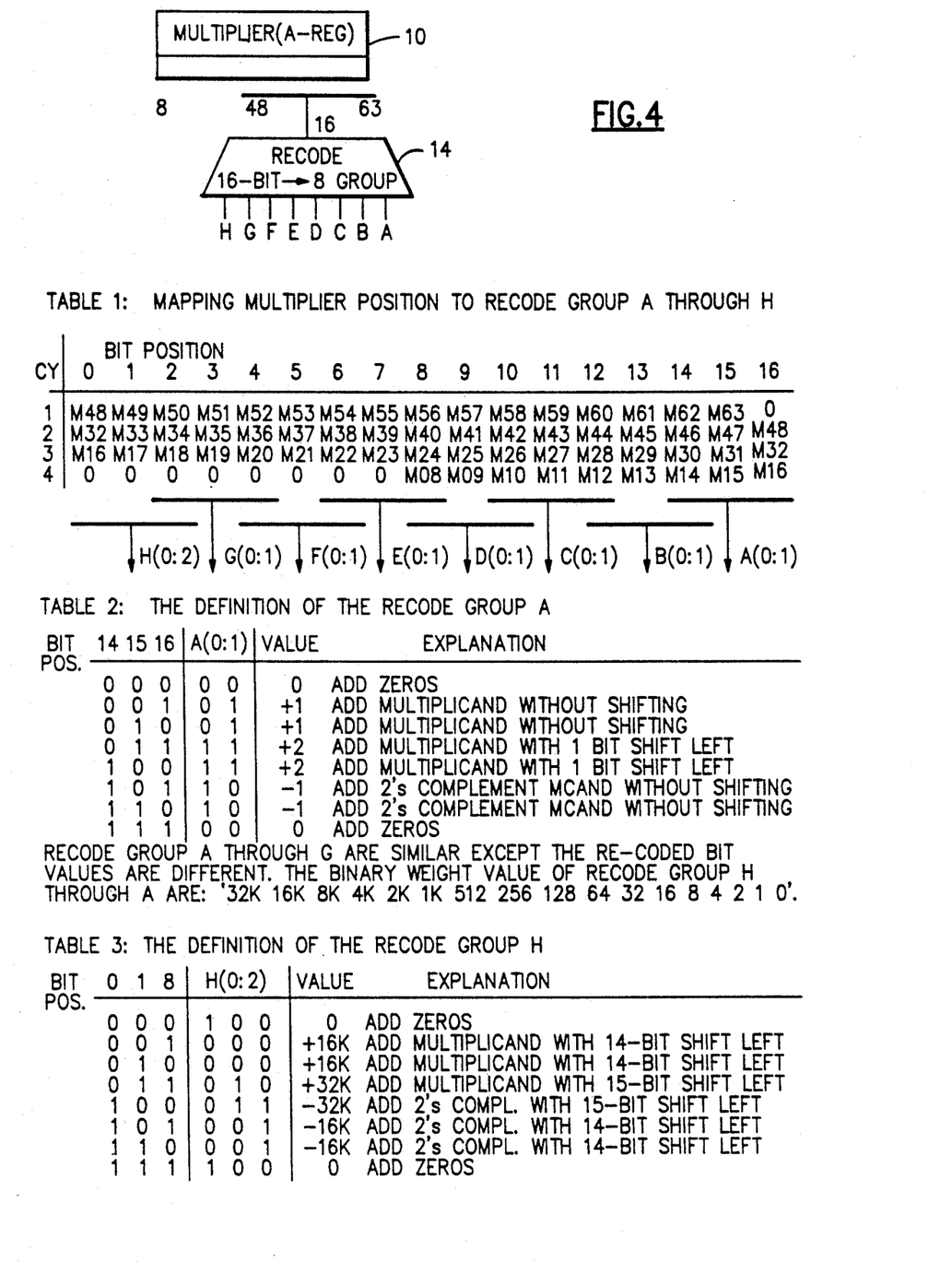
FIG. 4 is a simplified block diagram and tables illustrating the recode strategy of the multiplier according to the preferred embodiment of the invention.

FIG. 4 shows, in simplified form, the A register 10 and the recode circuitry 14. The three tables define the logic of the recode circuitry 14. Table 1 shows the recode grouping for every multiplier bit from the A register for each cycle of floating-point operations. For fixed-point, halfword and fixed-point, fullword operations, the operation stops after cycle 1 or cycle 2, respectively. As noted in FIG. 1, the multiplier is already right justified. Tables 2 and 3 show the recode control group definitions and weights. Groups A through G produce two control bits, or four conditions, for weighting the appropriate multiples, while group H generates three control bits for five conditions. This scheme is presented by Arnold Weinberger in "Multiplier Decoding with Lookahead", *IBM Technical Disclosure Bulletin*, vol. 20, Feb. 1978, pp. 3591-3.

Figure 5:
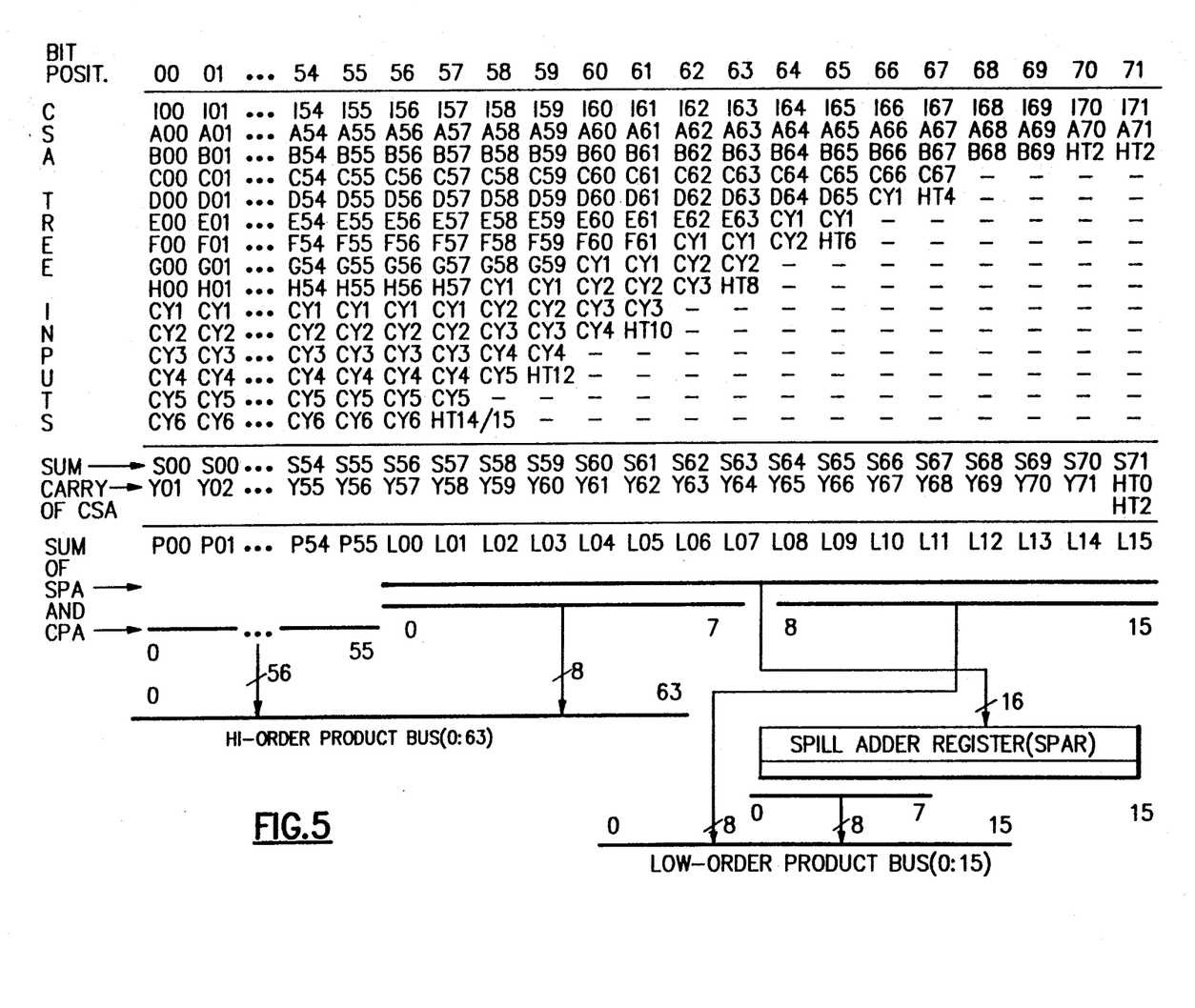
FIG. 5 is a table illustrating the data alignment of multiples and result generation according to the preferred embodiment of the invention.

FIG. 5 shows the data alignment in the CSA trees 20 and the CPA 24 along with the generation of the high and low-order product busses 30 and 34, respectively. Fed-back sums are noted by the letter I along with the data bit index. The eight multiples are noted by the letters A through H and the data bit index. For example, A00 is the most significant bit of multiple A, and I71 is the least significant bit of the fedback sum of multiple I. CY denotes the carries propagated between positions in the CSA tree shown in FIG. 3. S00 through S71 are the sum outputs of the CSA tree, and Y01 through Y71 are the carry outputs of the CSA tree, both of which feed the CPA 24 and SPA 22, with carry shifted left one bit for propagation. HT0 through HT15 are the weighted "hot" ones inserted, when appropriate, for multiples that need to be two's complemented as discussed above. P00 through P55 are high-order product outputs of the CPA 24, while L00 to L15 are the low-order product bits from the SPA 22.

The high and low-order product bus generation works as follows: During a fixed point, halfword single cycle operation, the prealignment of the multiplicand by a left shift of 8-bits forces eight zeroes to appear in L08-L15. Since the SPA register 32 is ignored during the first (only) cycle, the concatenation of L08-L15 and SPA 0:7) is all zeroes. The low order eight bits of the result appear on L00-L07, while the rest of the product appears on P00-P55 The concatenation of these values is the high order product bus with the data that is to be putaway is in the high-order bus bit locations 32-63.

During the fixed-point fullword operations, the prealignment of the multiplicand by a left shift of 24-bits causes zeroes to appear on L00-L15 and P48-P55 during the first cycle. As a result, the SPA register 32 is loaded with zeroes as is locations 48-55 of the sum register 26. During the second (final cycle), the same scenario occurs but the remembered sum in the sum register 26 is fed back while being shifted right 16-bits. Since the rightmost 8-bits are zero, zeroes appear on L08-L15, while the lowest-order 8-bits of the result appear on L00-L07 and the rest of the product appears on P00-P55. These are concatenated so the whole 64-bit product is put in the C register 28 ready for putaway.

Figure 8:
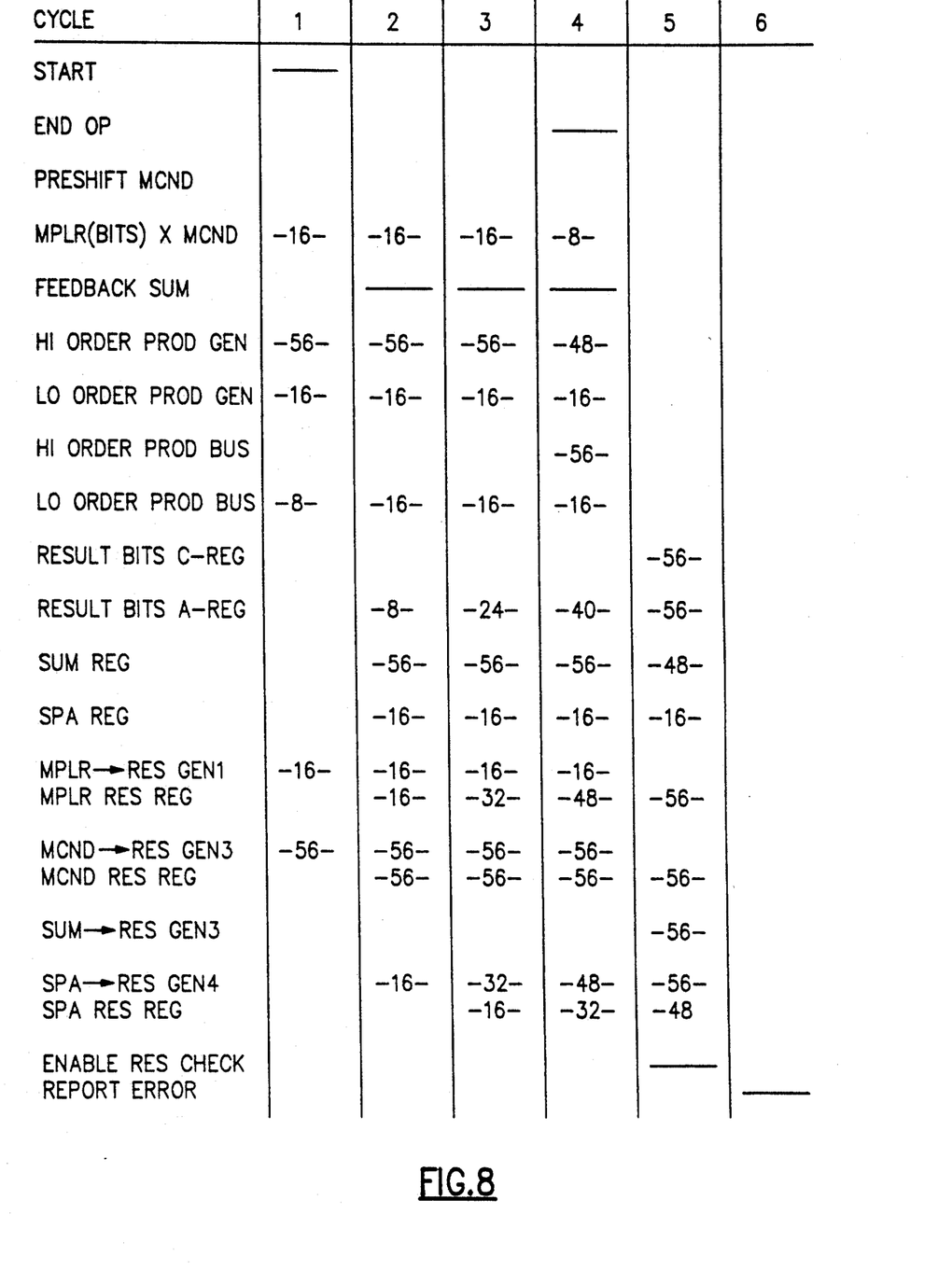
FIG. 8 is a cycle timing diagram for the multiplier of FIGS. 1 to 5 for a floating-point long operation.
Figure 9:
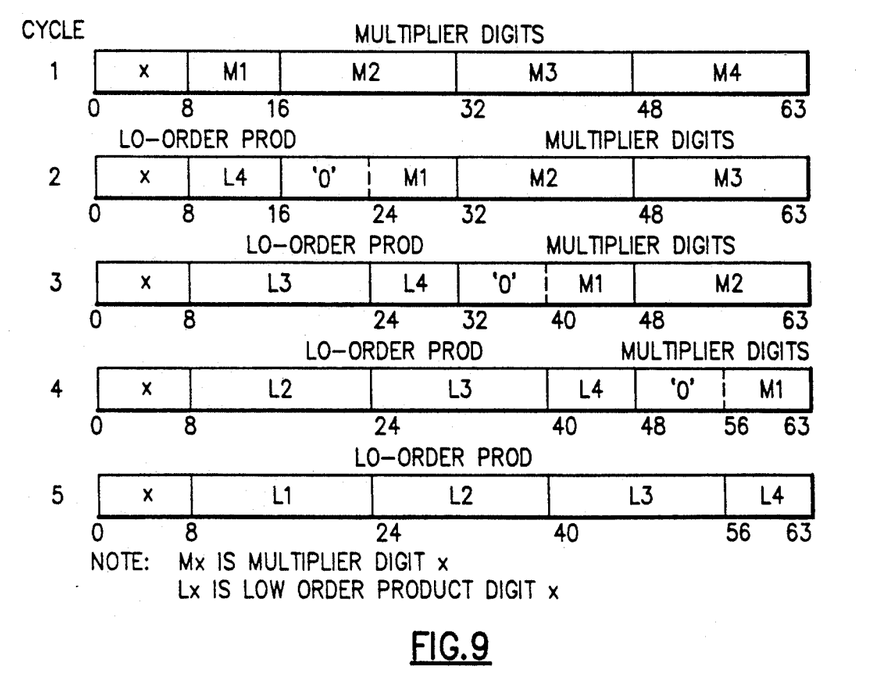
FIG. 9 is block diagram showing the contents of the "A" register (MULTIPLIER/LOW ORDER PRODUCT digits) during a floating-point long operation.

During floating-point operations, there is no prealignment of the multiplicand, and the result data is returned to the C and A registers 28 and 10, as shown in FIGS. 8 and 9. During the first cycle, valid data appears on L00-L015 and latched in the SPA register 32, while only L08-L15 are returned to the A register 10 on the low-order product bus 34. In the following cycles, L00-L015 are always valid and L08-L015 are concatenated with SPA register (0:7) to produce the output on low-order product bus 34 to the A register 10 while the SPA register 32 is loaded with the new L00-L15 data. Note that the data in SPA register (8:15) is always the same as the data returned on bits (0:8) of the low-order product bus 34 during the previous cycle. During the last cycle, the right justification of the operand data implies that only P08-P55 and L00-L15 contain valid data. L08-L15 is concatenated with SPA register (0:7) 32 for the low-order product bus as before while P00-P55 and L00-L07 are concatenated to produce an output on the high-order bus 30. Since P00-P07 are zeroes, they are over written by the result sign and exponent which have been generated elsewhere in the processor, and the result is gated into the C register 28. See FIG. 9 for a detailed description of the A register 10 contents during floating-point operations. The data in registers C and A are now ready for putaway.

Figure 6:
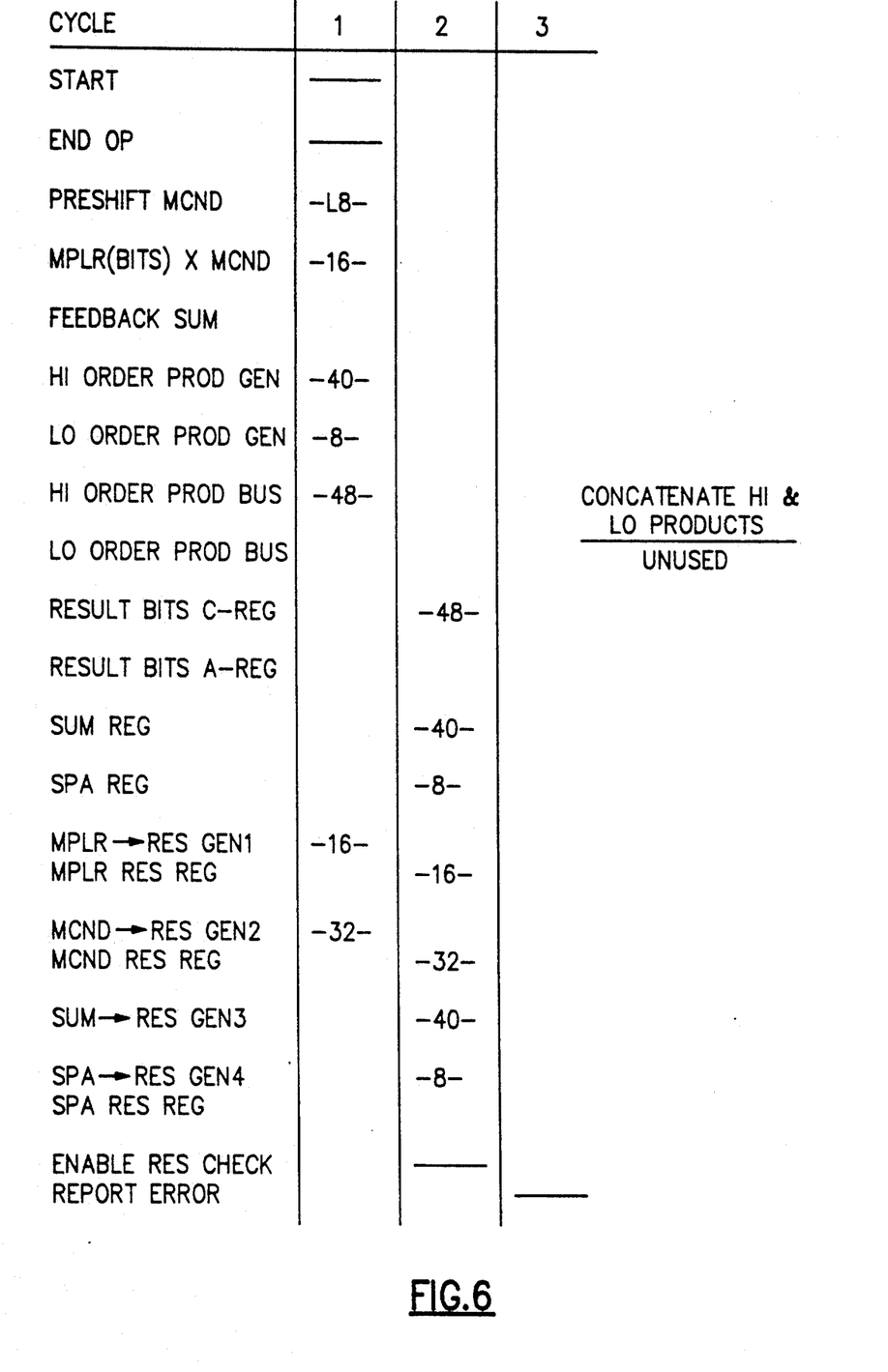
FIG. 6 is a cycle timing diagram for the multiplier of FIGS. 1 to 5 for a fixed-point halfword operation.

FIG. 6 shows the cycle activity for a fixed-point, halfword instruction. Almost everything is done in cycle 1. The process starts and ends in cycle 1. The process begins by pre-shifting the multiplicand left eight bits (L8). Next, all 16-bits of the multiplier are multiplied times the full multiplicand resulting in 40-bits of data being generated into high-order adder and 8-bits of data being generated in the low-order adder. These are concatenated together to give a 48-bit result which is putaway into the C register 28. The architecture dictates that the sixteen high-order bits are ignored, and the result is actually the right-most 32-bits of the 48-bit result.

In cycle 2, the data is in the C register 28 and the high and low results are latched in the sum and SPA registers 26 and 32, respectively. Also, there is data in the multiplier residue register 36 (FIG. 2) which is already valid. In the first cycle, 32-bits of the multiplicand is put through residue generator 46 to generate the multiplicand residue. The sum register 26 data and the SPA register 32 data go through residue trees 48 and 42, respectively, in FIG. 2, and in cycle 2, the residue check is enables and reported to the error detection circuitry on the next cycle.

Figure 7:
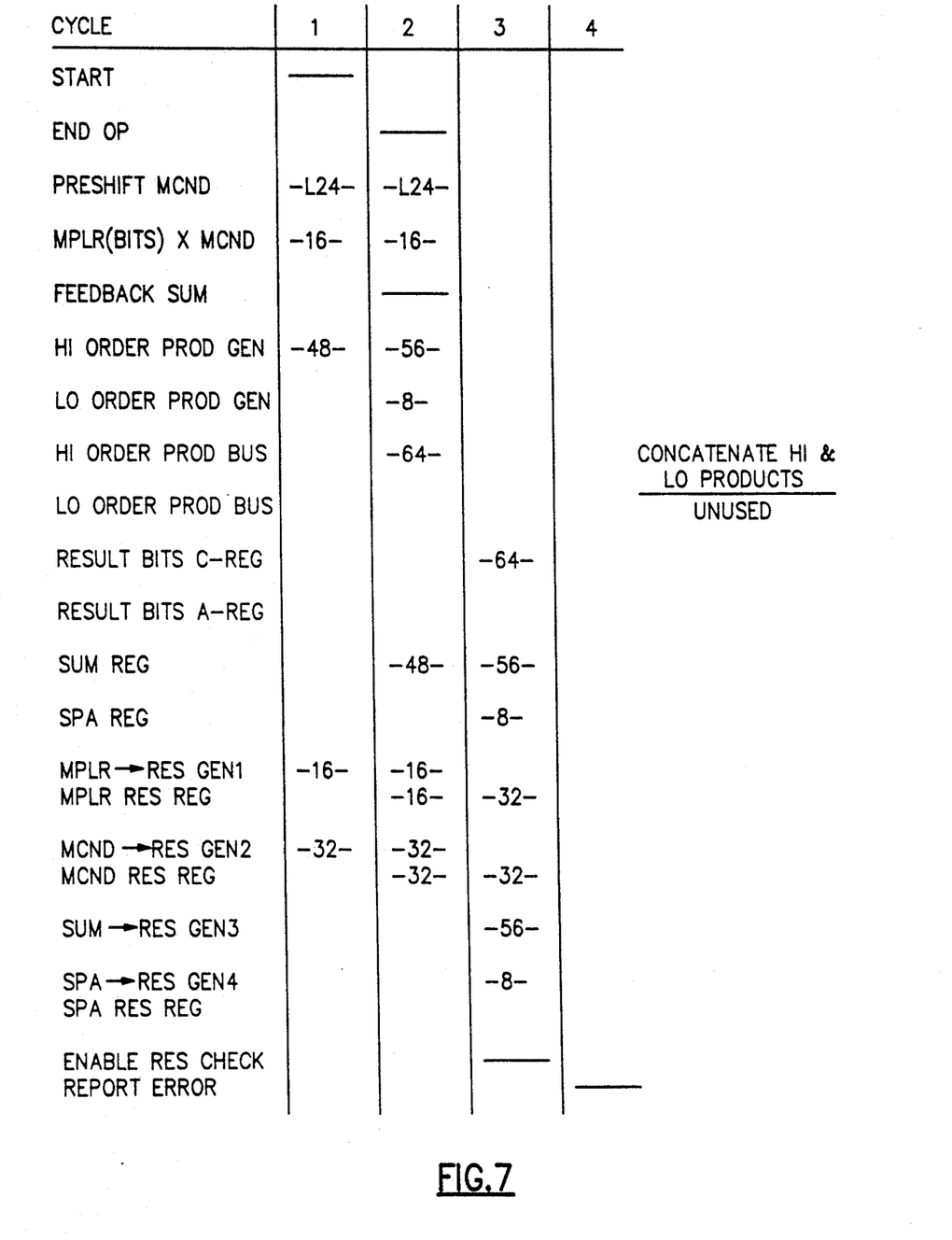
FIG. 7 is a cycle timing diagram for the multiplier of FIGS. 1 to 5 for a fixed-point fullword operation.

FIG. 7 is similar to FIG. 6, but for the fixed-point, fullword operation. Starting in cycle 1, the multiplicand is pre-shifted left 24-bits (L24), and the first 16-bits of the multiplier is multiplied times the multiplicand. 48-bits of data is thereby generated and latched in the sum register 26. During the second cycle, there is another left shift by 24-bits (L24). The remaining 16-bits of the multiplier times the multiplicand and the fed back previous partial product are used to generate 56-bits of high-order data in the CPA 24 and 8-bits of low-order result in the SPA 22. These two results are concatenated together to get the 64-bit result on the high-order product bus 30. The low-order product bus 34 is not needed. At the same time, the first 48-bits of sum are available in the sum register 26, and the first 16-bits of the low-order product have been sent through the multiplier residue generator 38 to get the first part of the multiplier residue. Also, 56-bits of the multiplicand are applied to the residue generator 48 to generate the residue of the multiplicand.

In the third cycle, the full result has been latched into the C register 28. The high-order sum has been latched into the sum register 26 and the low-order result has been latched into the SPA register 32, so the full residue can be generated at this point. The residue check is done and the result reported to the residue error circuitry on the next cycle.

FIG. 8 illustrates the process for floating-point operations. Notice here that the multiplicand is not preshifted as in fixed-point operations. Also, both the high-order and low-order product busses are used in floating-point operations. Otherwise, the process illustrated in FIG. 8 follows the descriptions of FIGS. 6 and 7.

FIG. 9 is an example of how the A register 10 is used during a floating-point operation. During the first cycle all multiplier digits are available in the A register. Again, the multiplier is shifted right 16-bits every cycle. FIG. 9 illustrates how the low-order product is loaded on the left side of the register. As the process goes through successive cycles finally reaching cycle 5, the whole low-order product is available in the A register 10.

While the invention has been described in terms of a single preferred embodiment, those skilled in the art will recognize that the invention can be practiced with modification within the spirit and scope of the appended claims.

Having thus described our invention, what we claim as new and desired to secure by Letters Patent is as follows:

1. A high speed multiplier circuit for performing multiplication of a multiplier and a multiplicand stored in first and second registers, respectively, and storing a product result in a third register for fixed-point data and in said third and first registers for floating-point data, comprising:

recording means connected to said first register for recoding a multiplier stored in said first register to generate control signal outputs;

preshift/sign circuitry connected to said second register for shifting said multiplicand left for fixed-point data and providing a sign signal during a fixed point multiplication cycle;

shift gate means connected to outputs of said preshift means and controlled by control signal outputs of said recoding means to output selected groups of bits of the multiplicand;

carry-save adder means connected to outputs of said shift gate means for adding a group of multiples of said multiplicand to generate carry and sum output signals;

spill adder means connected to low order outputs of said carry-save adder means for generating a low order portion of a final result of said multiplication;

storage means for temporarily storing said low order portion of said final result;

low-order bus means for transferring said low order portion of said final result to said first register during floating-point operations;

carry-propagate adder means for generating a high order portion of said final result from high order carry and said sum output signals of said carry-save adder means; and high order product bus means for transferring said high order portion of said final result to said third register.

2. The high speed multiplier circuit recited in claim 1 wherein said multiplier comprises sixteen bits and said multiplicand comprises fifty-six bits;

said preshift circuitry shifting said multiplicand left by eight bits for fixed-point, halfword input data and left by twenty-four bits for fixed-point, fullword input data;

said product result stored in said third register for fixed-point operations being aligned and requiring no shifting of said product result.

3. The high speed multiplier circuit recited in claim 2 wherein said carry-save adder means comprises a carry-save adder tree having nine inputs and two outputs, said two outputs being sum and carry outputs and divided into 56-bit high order portions and 16-bit low order portions.

4. The high speed multiplier circuit recited in claim 3 further comprising second storage means for temporarily storing partial products from said carry-propagate adder means, said second storage means being connected to one of said nine inputs to said carry-save adder tree, wherein said multiplier may comprise more than sixteen bits, said multiplier circuit further comprising means for shifting said partial product right by sixteen bits each cycle and feeding back partial products stored in said second storage means to said carry-save adder tree.

5. The high speed multiplier circuit of claim 1 wherein said carry-save adder means includes a carry-save adder tree of directly coupled full-adder means.

6. The high speed multiplier circuit of claim 5 wherein said carry-save adder means further includes a carry-save adder tree having nine inputs and two outputs, said carry-save adder tree comprising an array of seven full-adder means and said full-adder means having three inputs and two outputs.

7. The high speed multiplier circuit of claim 6 wherein:
operand inputs of a first full-adder means connect to a first-level logic output of said shift gate means and a previous partial product, and carry input of said first full-adder means connects to a first second-level logic output of said shift gate means;
operand inputs of a second full-adder means connect to second and third second-level logic outputs of said shift gate means, and carry input of said second full-adder means connects to sum output of said first full-adder means;
operand inputs of a third full-adder means connect to first and second third-level logic outputs of said shift gate means, and carry input of said third full-adder means connects to sum output of said second full-adder means;
operand inputs of a fourth full-adder means connect to a third third-level logic output of said shift gate means and a fourth-level logic output of said shift gate means, and carry input of said fourth full-adder means connects to sum output of said third full-adder means; and
operand inputs of subsequent full-adder means connect to intermediate carry's between adjacent carry-save adder trees and carry input of said subsequent full-adder means connect to sum output of preceding full-adder means.

8. The high speed multiplier circuit of claim 6 wherein said carry-save adder means further includes fifty-eight bit slices of carry-save adder trees comprising seven full-adder means, two bit slices of carry-save adder trees comprising six full-adder means, two bit slices of carry-save adder trees comprising five full-adder means, two bit slices of carry-save adder trees comprising four full-adder means, two bit slices of carry-save adder trees comprising three full-adder means, two bit slices of carry-save adder trees comprising three full-adder means and four bit slices of carry-save adder trees comprising one full-adder means.

9. The high speed multiplier circuit of claim 5 wherein intermediate carry outputs of said directly coupled full-adder means are propagated inside said carry-save adder means.

10. A high speed multiplier circuit for performing multiplication of a multiplier and a multiplicand stored in first and second registers, respectively, and storing a product result in a third register for fixed-point data and in said third and first registers for floating-point data, comprising:
recording means connected to said first register for recording a multiplier stored in said first register to generate control signal outputs;
preshift means connected to said second register for shifting said multiplicand left for fixed-point data;
shift gate means connected to outputs of said preshift means and controlled by control signal outputs of said recording means to output selected groups of bits of the multiplicand;
carry-save adder means connected to outputs of said shift gatemeans for adding a group of multiples of said multiplicand to generate carry and sum output signals;
spill adder means connected to low order outputs of said carry-save adder means for generating a low order portion of a final result of said multiplication;
storage means for temporarily storing said low order portion of said final result;
low-order bus means for transferring said low order portion of said final result to said first register during floating-point operations;
carry-propagate adder means for generating a high order portion of said final result from high order carry and said sum output signals of said carry-save adder means;
high order product bus means for transferring said high order portion of said final result to said third register;
multiplier residue generator means connected to said first register for generating a multiplier residue;
fixed-point, halfword multiplicand residue generator means connected to said second register for generating a multiplicand residue;
residue generator means receiving an output from said carry-propagate adder means for generating a sum residue;
multiplicand residue storage means selectively storing output from one of said fixed-point, halfword multiplicand residue generator means and said residue generator means;
spill adder residue generator means connected to said storage means for generating a spill adder residue; and
residue calculation means connected to said multiplier residue generator means, said multiplicand residue storage means, said residue generator means and said spill adder residue generator means for generating a residue checking output indicating whether an error has been detected.

11. The high speed multiplier circuit recited in claim 2 wherein said residue calculation means comprises:
residue multiplication means for multiplying said multiplier residue and said multiplicand residue to generate a residue product;

residue addition means for adding said sum residue and said spill adder residue to generate a residue sum; and residue compare means for comparing said residue product and said residue sum to generate a residue compare output.

12. The high speed multiplier circuit of claim 2 wherein said residue generator means selectively receive an output from one of said second register and said carry-propagate adder means for generating a sum residue.

* * * * *